United States Patent
Kim et al.

(10) Patent No.: US 9,094,985 B2
(45) Date of Patent: Jul. 28, 2015

(54) COMMUNICATION METHOD AND BEAM FORMING APPARATUS IN MULTI-CELL MOBILE COMMUNICATION SYSTEM

(71) Applicant: ELECTRONICS AND TELECOMMUNICATIONS RESEARCH INSTITUTE, Daejeon (KR)

(72) Inventors: Hee Wook Kim, Daejeong (KR); KunSeok Kang, Daegu (KR); Bon Jun Ku, Daejeon (KR); Do-Seob Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 334 days.

(21) Appl. No.: 13/779,033

(22) Filed: Feb. 27, 2013

(65) Prior Publication Data

US 2013/0252655 A1     Sep. 26, 2013

(30) Foreign Application Priority Data

Mar. 23, 2012  (KR) .................. 10-2012-0030157

(51) Int. Cl.
*H04B 7/00* (2006.01)
*H04W 72/08* (2009.01)
*H04B 7/185* (2006.01)
(Continued)

(52) U.S. Cl.
CPC ............ *H04W 72/08* (2013.01); *H04B 7/0408* (2013.01); *H04B 7/0491* (2013.01); *H04B 7/0617* (2013.01); *H04B 7/18513* (2013.01); *H04W 72/042* (2013.01); *H04W 72/044* (2013.01);
(Continued)

(58) Field of Classification Search
CPC ............ H04W 72/044; H04W 72/046; H04W 72/0453; H04W 16/28
USPC ......... 455/507, 508, 512, 514, 515, 500, 517, 455/67.11, 422.1, 403, 445, 429, 427, 428, 455/7, 12.1, 550.1, 426.1, 426.2, 455/414.1–414.4, 561, 450–453; 342/354, 342/154; 370/252, 310, 328, 329, 315, 316
See application file for complete search history.

(56) References Cited

U.S. PATENT DOCUMENTS

2010/0128656 A1   5/2010   Kim et al.
2013/0009809 A1*  1/2013   Bert et al. .................... 342/354

FOREIGN PATENT DOCUMENTS

KR      1020100058907 A    6/2010

OTHER PUBLICATIONS

KR101120643B1, Space division multi access service method for future wireless communication system base virtual sector, Mar. 16, 2012.*

(Continued)

*Primary Examiner* — Keith Ferguson
(74) *Attorney, Agent, or Firm* — Ladas & Parry LLP

(57) ABSTRACT

In a system that performs mobile communication using at least two beams, by determining a size of a beam based on information that is acquired for mobile terminals attempting an access, a beam of a form having an adaptive size is formed and thus communication is performed. A beam sector including a plurality of beam segments and a beam segment that forms a beam of a minimum size within entire coverage is set, and while forming one beam per beam sector, a size of a beam is adaptively determined.

19 Claims, 10 Drawing Sheets

(51) Int. Cl.
*H04B 7/04* (2006.01)
*H04B 7/06* (2006.01)
*H04W 72/04* (2009.01)

(52) U.S. Cl.
CPC ......... *H04W 72/046* (2013.01); *H04W 72/0453* (2013.01)

(56) References Cited

OTHER PUBLICATIONS

Peter D. Karabinis, et al; "Recent Advances That May Revitalize Mobile Satellite Systems", ASMS-TF, pp. 1-6, Jul. 2003.

* cited by examiner

COMMUNICATION METHOD AND BEAM FORMING APPARATUS IN MULTI-CELL MOBILE COMMUNICATION SYSTEM

CROSS-REFERENCE TO RELATED APPLICATION

This application claims priority to and the benefit of Korean Patent Application No. 10-2012-0030157 filed in the Korean Intellectual Property Office on Mar. 23, 2012, the entire contents of which are incorporated herein by reference.

BACKGROUND OF THE INVENTION (a) Field of the Invention

The present invention relates to a communication method. More particularly, the present invention relates to a communication method and a beam forming apparatus in a mobile communication system having a multi-cell.

(b) Description of the Related Art

Mobile satellite communication systems provide a broadcasting service in downtown and suburban areas through an integrated satellite and terrestrial network using a terrestrial auxiliary device such as a repeater, a complementary terrestrial component (CGC), and an ancillary terrestrial component (ATC). In this case, the mobile satellite communication system provides a broadcasting service through a satellite in a rural or suburban area in which a line of sight (LoS) is secured and provides a broadcasting service through a terrestrial auxiliary device in a downtown or indoor environment in which a satellite signal is not secured.

In the mobile satellite communication system, a radio wave that a satellite radiates to an earth surface area is referred to as a beam, and the earth surface area to which the beam is radiated is referred to as a cell. The mobile satellite communication system includes a single beam satellite communication system in which a satellite uses one beam, and a multi-beam satellite communication system in which a satellite uses two or more different beams. The multibeam satellite communication system divides a service area into several cells by multiple beams like a terrestrial cellular mobile communication system based on a base station, and a mobile terminal receives a service through a frequency corresponding to a beam radiated to where the mobile terminal is located.

Nowadays, as requests for a high definition multimedia service increase, the mobile satellite communication system should provide a wideband service. However, recently, the bandwidth that is allocated for mobile satellite communication services has become very limited. For example, a satellite IMT-2000 band that is allocated to ITU-R (radio-communication sector) is the 30 MHz band for each of an uplink and a downlink. Specifically, 1980-2010 MHz is allocated to the uplink, and 2170-2200 MHz is allocated to the downlink.

In order to provide a wideband service, because a radio interface having a bandwidth of at least 10 MHz is considered, the frequency that is allocated to embody a frequency reuse ratio of 3 or 7 is very limited. For example, it is difficult to embody a frequency reuse ratio of 7, and there is a problem that a frequency of all bands should be allocated to an operator having a frequency reuse ratio of 3. Therefore, in order to provide a wideband service, it is essential to embody a mobile satellite communication system having a frequency reuse ratio of 1. Unlike a code division multiple access (CDMA)-based mobile communication system, in an orthogonal frequency division multiplexing (OFDM)-based satellite communication system, due to an interference problem between adjacent cells, a frequency reuse of ratio 1 is not generally, satisfied and thus in a cellular communication environment, the OFDM-based satellite communication system has characteristics that are less appropriate than those of the CDMA-based mobile communication system.

In order to solve this, by enabling a terrestrial network to satisfy a frequency reuse ratio of 1 through several fractional frequency reuses, the terrestrial network is appropriate for a cellular environment. Specifically, by dividing one cell into several areas and by enabling each area to use a portion of subcarriers, even in a situation of a frequency reuse ratio of 1, a method of reducing interference between adjacent cells was used.

However, in this way, a method of use in a terrestrial network can be applied under an assumption that much difference exists in a path loss value in a base station vicinity area and a cell boundary area and that a signal may be separated and transmitted to each divided area of a cell, as each sector has an antenna. Therefore, a fractional frequency reuse method that is applied to a terrestrial network cannot be applied to a satellite network in which a signal cannot be separated on an area basis within one beam.

As technology about a fractional frequency reuse method in a satellite network, there is an "Apparatus and method of mobile satellite communication comprising complementary terrestrial component applied fractional frequency reuse technique" that is disclosed in Korean Unexamined Patent Application Publication No. 2010-0058907. In this technology, by enabling a mobile terminal and a satellite to communicate using different subcarrier groups on a beam basis, a fractional frequency of a subcarrier group that other beams do not use may be reused, and each beam performs communication between a mobile terminal and a terrestrial auxiliary device using a subcarrier group that is not used when a mobile terminal and a satellite communicate.

However, as such technology uses a partial frequency in a beam boundary area, there is a drawback that spectral efficiency is deteriorated and an interference problem from another beam occurs, and thus a limitation exists in terms of entire system capacity.

SUMMARY OF THE INVENTION

The present invention has been made in an effort to provide a communication method and a beam forming apparatus having advantages of more efficiently having a frequency reuse ratio of 1 in a mobile communication system having a multi-cell.

The present invention has been made in an effort to further provide a communication method and a beam forming apparatus having advantages of communicating through a beam whose size is adaptively adjusted.

An exemplary embodiment of the present invention provides a communication method in a system that performs mobile communication using at least two beams, the communication method including: acquiring, when a mobile terminal attempts an access through a second terminal access interval that is set to an uplink frame based on a downlink signal that is transmitted through a first terminal access interval that is set to a downlink frame, information about the mobile terminal; allocating a resource for the mobile terminal; transmitting the resource allocation information from the downlink frame through the first terminal access interval; determining a beam size based on information that is acquired for the mobile terminal; and communicating with the mobile terminal through an allocated resource according to a beam that is formed based on the determined beam size.

The first and second terminal access intervals may be intervals that transmit to and receive from anywhere in the entire coverage that the system services and into which all terminals can access, and that do not form a multi-beam.

The communication method may further include determining mobile terminals for forming an optimal beam among mobile terminals attempting the access, wherein the transmitting of the resource allocation information includes transmitting information about the determined mobile terminal.

The information that is acquired for the mobile terminal may include a location, a requested quality of service (QoS), and a channel state of the mobile terminal, and the determining of mobile terminals includes setting each beam sector including a plurality of beam segments and a beam segment that forms a beam of a minimum size based on the acquired information and selecting one mobile terminal on a beam sector basis.

The determining of a beam size may include forming only one beam per beam sector in consideration of interference between mobile terminals.

The determining of a size may include determining, when a mobile terminal that requests communication does not exist at a beam group adjacent to a beam group including a beam sector at which a mobile terminal that is selected at one beam sector among the mobile terminals is located, a size of a beam for the mobile terminal according to whether a QoS that the mobile terminal requests satisfies a size corresponding to one of a beam group, a beam sector, and a beam segment.

The determining of a size may include determining, when a mobile terminal that requests communication does not exist at a beam sector adjacent to a beam sector at which a mobile terminal that is selected at one beam sector among the mobile terminals is located, a size of a beam for the mobile terminal according to whether a QoS that the mobile terminal requests satisfies a size corresponding to one of a beam sector and a beam segment.

The determining of a size may include determining, when a mobile terminal that requests communication exists at a beam sector adjacent to a beam sector in which a mobile terminal that is selected at one beam sector among the mobile terminals is located, a size of a beam for the mobile terminal to be a size corresponding to a beam segment at which the mobile terminal is located.

The determining of a size may include: acquiring information including a channel environment and a channel state for all terminals attempting the access; and determining maximum power and an angle of a beam that a satellite can transmit and transmission power of a beam based on an antenna gain, a channel environment, and a channel state according to a beam angle, and determining a direction of a beam based on the determined transmission power.

A frequency reuse ratio of the mobile terminal may be 1.

Another embodiment of the present invention provides a communication method in a system that performs mobile communication using at least two beams, the communication method including: acquiring information including a location, a requested QoS, and a channel state of mobile terminals attempting an access, and setting a beam sector including a beam segment that forms a beam of a minimum size and a plurality of beam segments based on the acquired information; selecting one mobile terminal on a beam sector basis and determining a size of a beam for the mobile terminal based on the information that is acquired for the selected mobile terminal; forming a beam having the determined size and forming one beam on a beam sector basis; and communicating with the mobile terminal through the formed beam.

The determining of a size may include determining, when a mobile terminal that requests communication does not exist at a beam group adjacent to a beam group including a beam sector at which a mobile terminal that is selected at one beam sector among the mobile terminals is located, a size of a beam for the mobile terminal according to whether a QoS that the mobile terminal requests satisfies a size corresponding to one of a beam group, a beam sector, and a beam segment.

The determining of a size of a beam for the mobile terminal may include: determining, when a QoS that the mobile terminal requests is satisfied based on a beam of a size of a beam group in which the mobile terminal is included, a size of a beam for the mobile terminal to be a size corresponding to a beam group; determining, when a QoS that the mobile terminal requests is not satisfied based on a beam group size and when a QoS that the mobile terminal requests is satisfied based on a beam of a size of a beam sector in which the mobile terminal is included, a size of a beam for the mobile terminal to be a size corresponding to a beam sector; and determining, when a QoS that the mobile terminal requests is not satisfied based on a beam of a beam sector size and when a QoS that the mobile terminal requests is satisfied based on a size of a beam segment in which the mobile terminal is included, a size of a beam for the mobile terminal to be a size corresponding to a beam segment.

The determining of a size may include: determining, when a mobile terminal that requests communication does not exist at a beam sector adjacent to a beam sector in which a mobile terminal that is selected at one beam sector among the mobile terminals is located, if a QoS that the mobile terminal requests is satisfied based on a beam of a size of a beam sector in which the mobile terminal is included, a size of a beam for the mobile terminal to be a size corresponding to a beam sector; and determining, when a QoS that the mobile terminal requests is not satisfied based on a beam of the beam sector size and when a QoS that the mobile terminal requests is satisfied based on a beam of a size of a beam segment in which the mobile terminal is included, a size of a beam for the mobile terminal to be a size corresponding to a beam segment.

Yet another embodiment of the present invention provides a beam forming apparatus in a system that performs mobile communication using at least two beams, the beam forming apparatus including: a terminal location information acquisition unit that acquires location information of mobile terminals attempting an access; a parameter information acquisition unit that acquires information including a channel state and a QoS that is requested to mobile terminals attempting an access; a beam forming controller that sets a beam sector including a beam segment that forms a beam of a minimum size and a plurality of beam segments based on information that is acquired for mobile terminals; a group beam forming unit that forms one beam on a beam group basis including a plurality of beam sectors; a sector beam forming unit that forms one beam on a beam sector basis; and a segment beam forming unit that forms one beam on a beam segment basis. The beam forming controller selects one mobile terminal on a beam sector basis, determines a beam size of the mobile terminal based on the information that is acquired for the selected mobile terminal, and forms a beam by driving one of the group beam forming unit, the sector beam forming unit, and the segment beam forming unit.

The beam forming controller may determine, when a mobile terminal requesting communication does not exist at a beam group adjacent to a beam group including a beam sector at which a mobile terminal that is selected at one beam sector is located or at a beam sector adjacent to a beam sector at which the mobile terminal is located, a beam size for the mobile terminal according to whether a QoS that the mobile terminal requests satisfies a size corresponding to one of a beam group, a beam sector, and a beam segment.

The beam forming controller may determine, when a terminal requesting communication exists at a beam sector adjacent to a beam sector in which a mobile terminal that is selected at one beam sector is located, a size of a beam for the mobile terminal to be a size corresponding to a beam segment at which the mobile terminal is located.

DETAILED DESCRIPTION OF THE EMBODIMENTS

Figure 1:
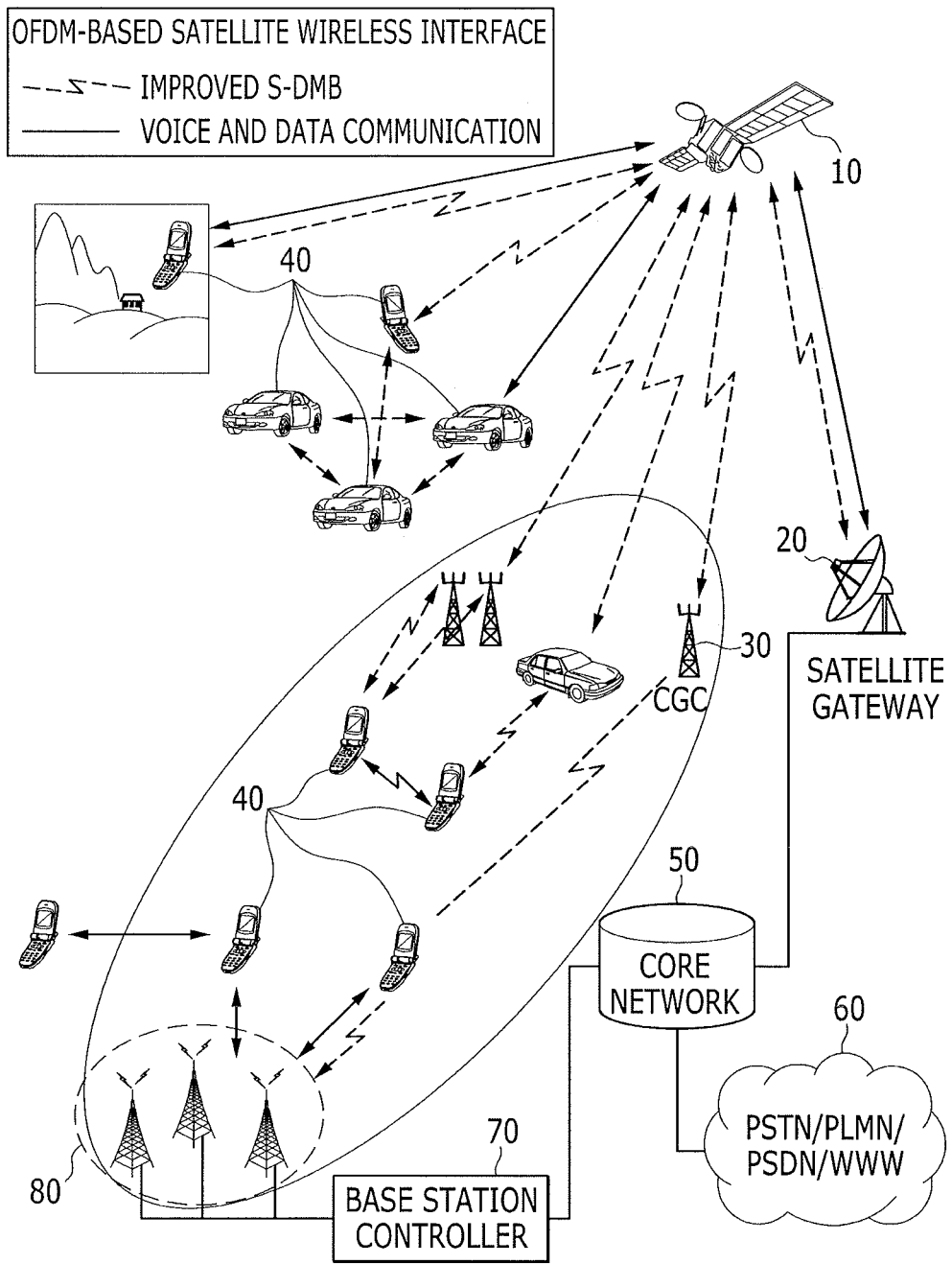
FIG. 1 is a configuration diagram illustrating a mobile communication system having a multi-cell according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

In this specification, a mobile terminal (MT) may indicate a mobile earth station (MES), a mobile station (MS), a terminal, a subscriber station (SS), a portable subscriber station (PSS), user equipment (UE), and an access terminal (AT), and may include an entire function or a partial function of the MT, the MES, the MS, the terminal, the SS, the PSS, the UE, and the AT.

Further, in this specification, a satellite base station may indicate a satellite gateway, a base station (BS), an access point (AP), a radio access station (RAS), a node B, a base transceiver station (BTS), and a mobile multihop relay (MMR)-BS, and may include an entire function or a partial function of the satellite gateway, the BS, the AP, the RAS, the node B, the BTS, and the MMR-BS.

Hereinafter, a communication method and a beam forming apparatus in a mobile communication system having a multi-cell according to an exemplary embodiment of the present invention will be described with reference to the drawings.

FIG. 1 is a configuration diagram illustrating a mobile communication system having a multi-cell according to an exemplary embodiment of the present invention.

As shown in FIG. 1, a mobile communication system having a multi-cell according to an exemplary embodiment of the present invention includes a multi-beam satellite 10, which is a space platform, a satellite gateway 20, and a terrestrial auxiliary device 30, and the mobile communication system is connected to the mobile terminal 40.

The satellite 10 relays communication between the satellite gateway 20 and the mobile terminal 40, between the mobile terminals 40, and between earth stations 30, and forms a communication link through a predetermined beam with the mobile terminal 40 that is located at a service area that is divided into a plurality of cells.

The satellite gateway 20 connects a satellite network to another wireless communication network like a plurality of terrestrial networks or the Internet, and functions as a gateway for operating and managing a multi-beam satellite network. The satellite gateway 20 may be connected to another communication network 60 (e.g., a PSTN) through a core network 50, and the core network 50 may also be connected to a terrestrial base station 80 of a terrestrial network through a base station controller 70. Such a satellite gateway 20 may function as a satellite base station.

The terrestrial auxiliary device 30 relays data between the satellite 10 and the mobile terminal 40. The satellite 10 uses a multi-beam when communicating with the mobile terminal 40, and particularly, forms a beam whose size and bandwidth change, and transmits a corresponding satellite signal to the mobile terminal 40, while the terrestrial auxiliary device 30 relays each beam to a corresponding mobile terminal 40.

The mobile terminal 40 receives a communication service through a satellite network or a terrestrial network in a state that it is located at a random cell within a service area. The mobile terminal 40 forms a communication link with the satellite 10 through a beam corresponding to a located cell, receives a communication service through the satellite 10, and may be located at a location corresponding to several beams when moving. The mobile terminal 40 receives a broadcasting service through the satellite 10 in, for example, a suburban or rural area in which an LoS is secured, and receives a broadcasting service through the terrestrial auxiliary device 30 in a downtown or indoor environment in which a satellite signal is not secured due to buildings.

Here, as shown in FIG. 1, the present invention is described based on an individual mobile satellite communication system having most commonality with a terrestrial network (e.g., an LTE system), but a communication method and a beam forming apparatus according to the present invention are not limited thereto and can be applied regardless of an access specification (e.g., OFMA, CDMA, FDMA, TDMA) in all satellite mobile systems using a terrestrial auxiliary device of various forms such as a satellite digital multimedia broadcasting (DMB) and European digital video broadcasting-satellite services to handhelds (DVB-SH).

Figure 2:
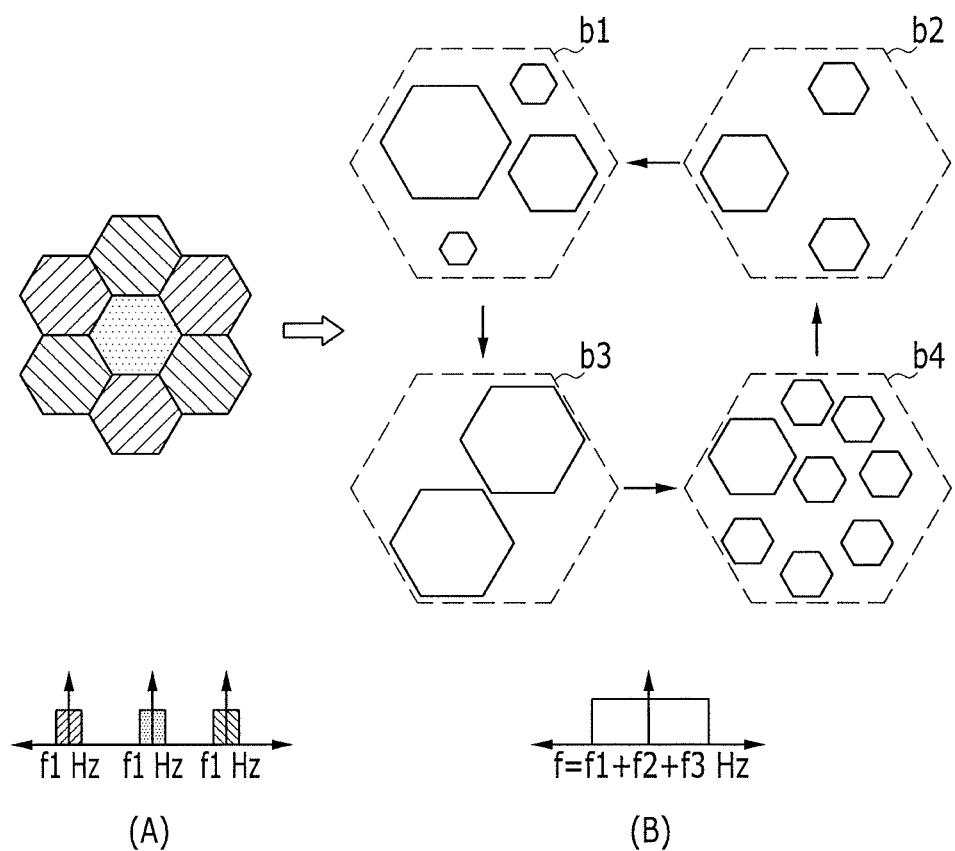
FIG. 2 is a conceptual diagram illustrating beam formation using a communication method according to an exemplary embodiment of the present invention.

FIG. 2 is a conceptual diagram illustrating beam formation using a communication method according to an exemplary embodiment of the present invention.

In general, in a mobile communication system using a satellite, when designing a satellite, a fixed multi-beam is formed and used. That is, as shown in the left side A of FIG. 2, when a multi-beam is designed, a size and a shape of a designed multi-beam are not changed, and communication is performed through a beam corresponding to a cell at which the mobile terminal is located. In this case, the mobile terminal does not receive a service of a capacity or more according to a beam of a corresponding cell. For example, a multi-beam satellite communication system may use a 30 MHz bandwidth, and when a frequency reuse ratio is 3, the mobile terminal does not receive a service of a 10 MHz bandwidth or more. That is, one beam may use only one frequency of f1, f2, and f3.

In an exemplary embodiment of the present invention, in consideration of information according to a beam forming parameter instead of fixing a multi-beam, an optimal multi-beam whose size is adaptively adjusted is formed.

As shown in the right side B of FIG. 2, a size of beams that the satellite outputs changes within the entire coverage (indicated by a dotted line) of a mobile communication system using a satellite. As the size of beams changes, a location to which a corresponding beam is applied also changes, and the shape of the beam also changes. In consideration of a beam forming parameter of a mobile terminal that a service wants at every moment, a beam that is optimized at that moment is formed. Here, the beam forming parameter includes a location of a terminal, QoS of a terminal, interference between terminals, speed of a terminal, a channel state of a terminal, the number of terminals, and a service requirement of a terminal. For example, when the number of mobile terminals requesting a service is smaller than a predetermined number and a channel state of the mobile terminal satisfies a predetermined condition, when a beam forming condition is a good state, in a plurality of beam forms that are shown in FIG. 2, multi-beams may be formed like the third beam form b3. However, when the number of mobile terminals is larger than the predetermined number and a channel state does not satisfy a predetermined condition, when a beam forming condition is not good, multi-beams having a sharp shape like the fourth beam form b4 that is shown in FIG. 2 may be formed.

An exemplary embodiment of the present invention forms a beam having an optimal size in consideration of a beam forming parameter, and the formed one beam can use all frequencies. For example, when a multi-beam satellite communication system uses a 30 MHz bandwidth, the multi-beam satellite communication system may provide a service to the mobile terminal using the entire 30 MHz bandwidth. That is, one beam can use all frequencies corresponding to f=f1+f2+f3. In this way, because formed multi-beams use all frequencies, interference between beams should not exist.

In an exemplary embodiment of the present invention, for each mobile terminal, a flexible optimal beam is formed, and in order to allocate a resource to a corresponding mobile terminal at an interval at which the optimal beam is formed, an interval at which the mobile terminal can be accessed is provided anywhere within the entire coverage. For this purpose, in uplink and downlink frames, a specific interval is set as an interval in which a multi-beam is not formed and that can be transmitted in the entire coverage and to which all mobile terminals can be thus accessed. Hereinafter, in a frame, a specific interval to which a terminal can be accessed is referred to as a "terminal access interval".

Figure 3:
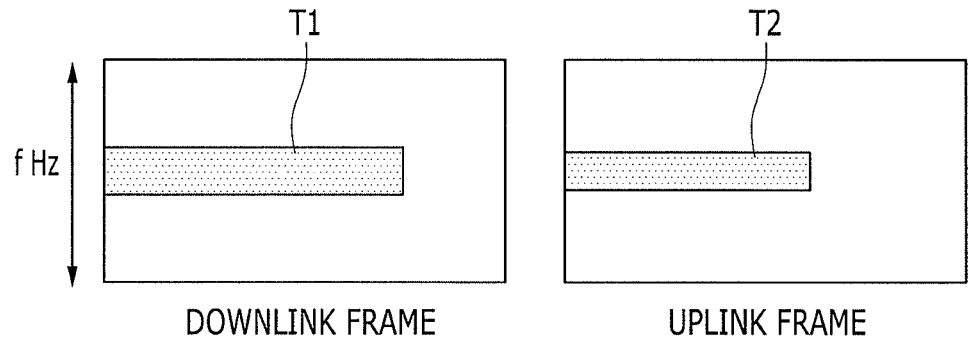
FIG. 3 is a diagram illustrating a terminal access interval on a frame according to an exemplary embodiment of the present invention.

FIG. 3 is a diagram illustrating a terminal access interval on a frame according to an exemplary embodiment of the present invention.

For each mobile terminal, an optimal beam is formed, and in order to allocate a resource to a corresponding mobile terminal at an interval in which the optimal beam is formed, a terminal access interval at which a terminal can connect should exist anywhere in the coverage (e.g., coverage indicated by a dotted line in FIG. 2) in which an entire service is available. For this purpose, as shown in FIG. 3, a specific interval of each downlink frame and uplink frame is set as terminal access intervals T1 and T2 in which a multi-beam is not formed and to which all mobile terminals can be accessed in the entire coverage.

In order to attempt an access, each mobile terminal searches for a transmitted downlink signal of the designated terminal access interval T1 in the entire coverage, acquires signal synchronization from the downlink signal, and acquires system information. The mobile terminal attempts an access through the terminal access interval T2 that may be received in the entire coverage in an uplink frame based on the acquired system information. Terminals that can form an optimal beam at that moment are determined based on terminals attempting an access, and a location of a resource of the determined terminals is determined. The determined information is notified to mobile terminals through the terminal access interval T1 that is transmitted to the entire coverage of a downlink. The mobile terminal determines a resource that is allocated thereto based on resource allocation information that is transmitted to the entire coverage, and receives and transmits a signal through a corresponding resource.

As shown in FIG. 3, at the terminal access intervals T1 and T2 that can be transmitted in the entire coverage on a downlink and uplink basis, information may be transmitted for an entire time interval at a specific bandwidth or information may be transmitted for only a partial time interval at a specific bandwidth. For example, when a transmitting control data amount in the entire coverage is not much, information may transmitted only be to time interval at a specific bandwidth.

Further, when information that should be transmitted in the entire coverage through the terminal access intervals T1 and T2 is important information, a signal of the corresponding information is transmitted with high power so that all terminals may receive it.

Figure 4:
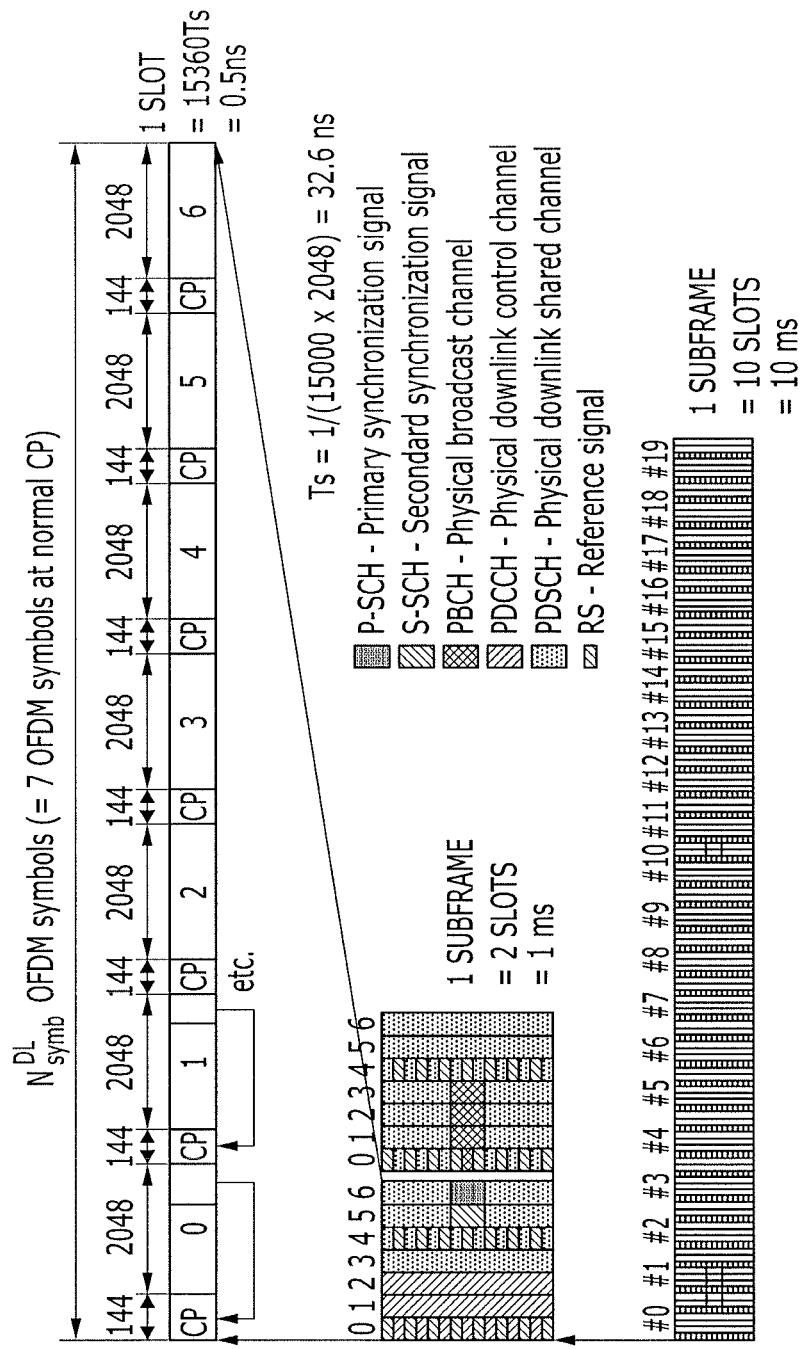
FIG. 4 is a diagram illustrating a structure of a frame according to an exemplary embodiment of the present invention.

FIG. 4 is a diagram illustrating a structure of a frame according to an exemplary embodiment of the present invention. FIG. 4 illustrates a frame structure in a mobile communication system having a wireless interface structure such as long term evolution (LTE).

When having a frame structure of the same form as that of FIG. 4, a primary-synchronization channel (P-SCH), a secondary-synchronization channel (S-SCH), a physical broadcast control channel (PBCH), a packet data control channel (PDCCH), and an reference signal (RS) channel should be transmitted so that all terminals may receive it in the entire coverage. However, a physical downlink shared channel (PDSCH) may be transmitted only to a specific terminal according to optimal multi-beam formation in consideration of a beam forming parameter.

Hereinafter, a communication method according to an exemplary embodiment of the present invention will be described.

Figure 5:
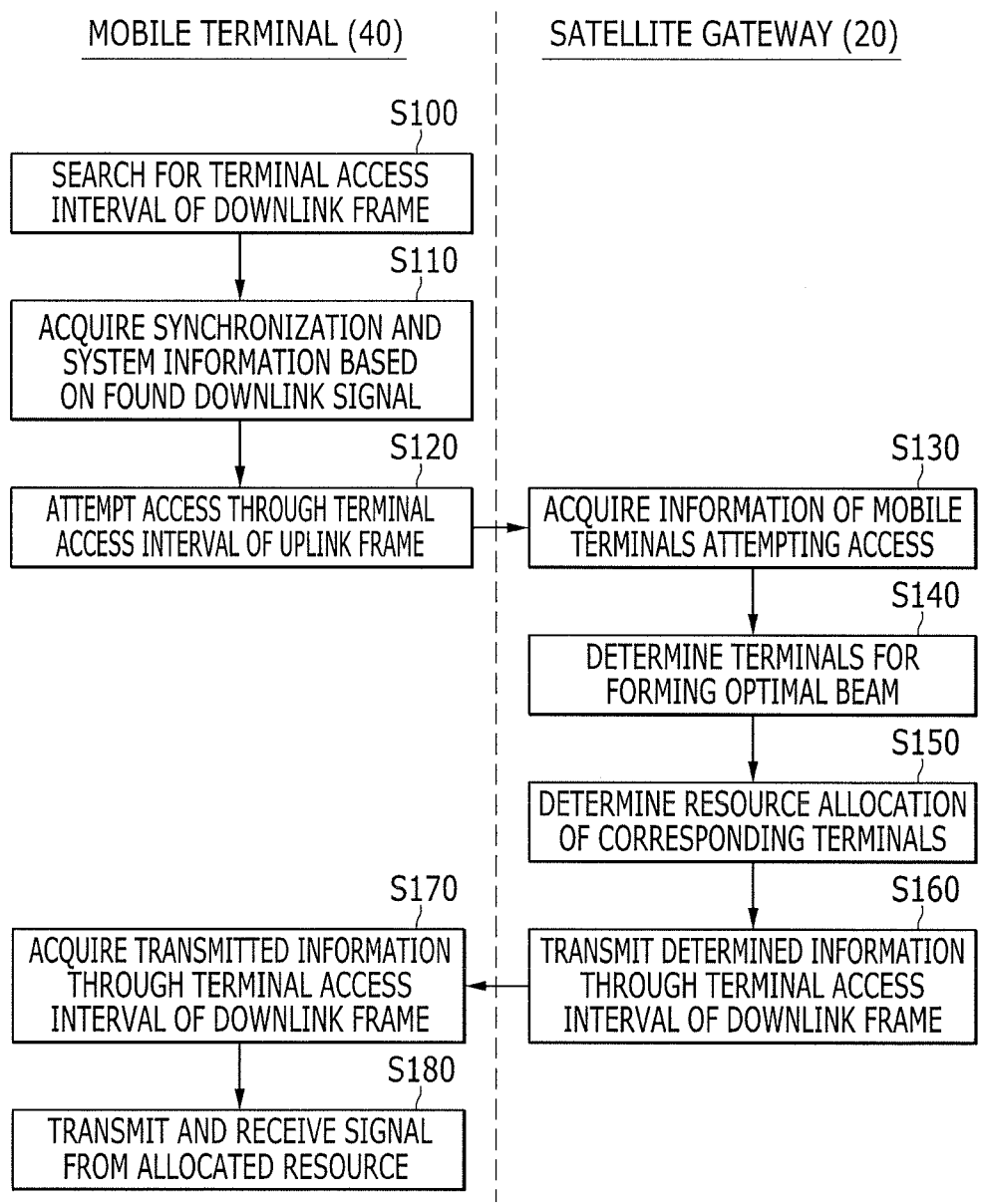
FIG. 5 is a flowchart illustrating a communication method according to an exemplary embodiment of the present invention.

FIG. 5 is a flowchart illustrating a communication method according to an exemplary embodiment of the present invention.

A mobile communication system according to an exemplary embodiment of the present invention transmits a signal including system information and a synchronization signal for an access through a predetermined terminal access interval T1 in a downlink frame, and mobile terminals that are located within the entire coverage may receive the transmitted signal.

As shown in FIG. 5, in order to attempt an access, the mobile terminal 40 searches for a downlink signal of the terminal access interval T1 of a downlink frame that can receive within the entire coverage of a satellite (S100).

When the mobile terminal 40 searches for a downlink signal through the designated terminal access interval T1 of the downlink frame, the mobile terminal 40 acquires signal synchronization from the found downlink signal and acquires system information (S110). The mobile terminal 40 attempts an access through a predetermined terminal access interval T2 to receive in the entire coverage in an uplink frame based on the acquired information (S120).

A satellite base station, i.e., the satellite gateway 20, acquires parameter-related information including location information of mobile terminals attempting an access through the terminal access interval T2 of the uplink frame (S130). That is, the satellite gateway 20 acquires location information of a mobile terminal attempting an access to a satellite network, a QoS and channel state of a mobile terminal, and a service requirement of a mobile terminal.

The satellite gateway 20 determines terminals that can form an optimal beam at that time point based on information about terminals attempting an access (S140). Here, a terminal that can form an optimal beam is determined according to various references based on location information, a QoS, and channel state information of terminals. For example, by selecting terminals that minimize interference or by selecting a combination of terminals that maximize an entire system capacity, terminals that can form an optimal beam may be determined, or by selecting terminals that can provide fairness based on QoS, terminals that can form an optimal beam may be determined.

The satellite gateway 20 determines allocation of a resource of the determined terminals (S150). The satellite gateway 20 notifies mobile terminals of the determined information through the terminal access interval T1 that is transmitted to the entire coverage of a downlink (S160).

The mobile terminal 40 determines a resource that is allocated thereto based on transmitted resource allocation information in the entire coverage through the terminal access interval T1 of the downlink frame (S170), and receives and transmits a signal through a corresponding resource (S180).

In this way, communication is performed, and a beam forming apparatus according to an exemplary embodiment of the present invention forms a beam for terminals attempting an access.

Hereinafter, an apparatus and method for forming an adaptively changing beam based on a beam forming parameter will be described.

First, an apparatus and method for forming a beam according to a first exemplary embodiment of the present invention will be described.

In a method of forming a beam according to a first exemplary embodiment of the present invention, in order to form a beam having a flexible size, a segment that forms a beam of a minimum size is referred to as a "beam segment", an area including a plurality of beam segments is referred to as a "beam sector", and an area including a plurality of beam sectors is referred to as a "beam group".

Figure 6:
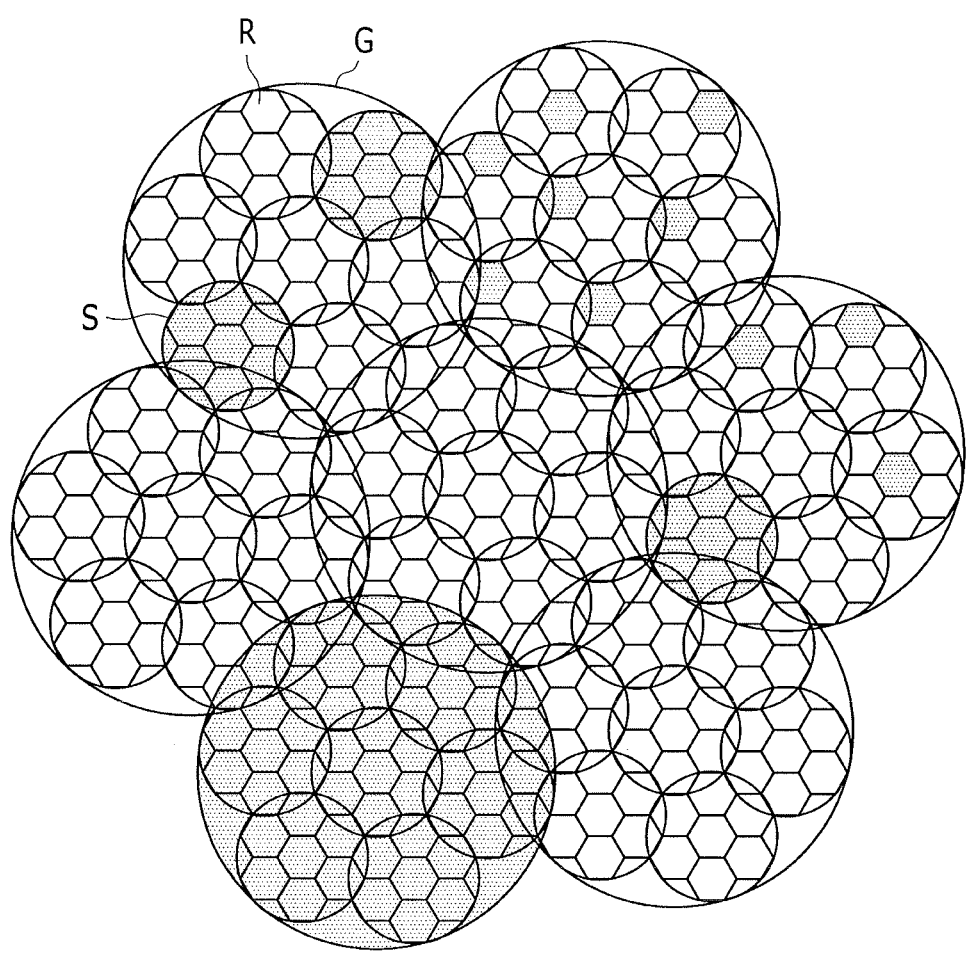
FIG. 6 is a diagram illustrating beam formation segments according to a first exemplary embodiment of the present invention.

FIG. 6 is a diagram illustrating beam formation segments according to a first exemplary embodiment of the present invention. As shown in FIG. 6, when a communication service is provided with 7 beams through an array antenna, a virtual beam segment R in which a beam may be formed in a minimum size is set, one beam sector S including seven beam segments is set, and one beam group G including seven beam sectors is set.

When a beam is formed in a beam segment unit, interference may occur between beams, and thus a plurality of virtual beam sectors that are larger than a beam segment are set, and by forming only one beam per beam sector, interference between beams can be reduced. That is, mobile terminals that are located on a beam segment basis are determined, and by forming a beam at a beam segment in which a mobile terminal exists in consideration of all beam segments, communication may be attempted on a beam segment basis with a frequency reuse ratio of 1, but in this case, interference between beams may occur on an adjacent beam segment basis. Therefore, in order to avoid interference, a virtual beam sector including a plurality of beam segments is set, and only one beam is formed per beam sector. A size of a beam to be formed in a corresponding beam sector is adaptively set according to whether a mobile terminal exists at an adjacent beam sector.

Figure 7:
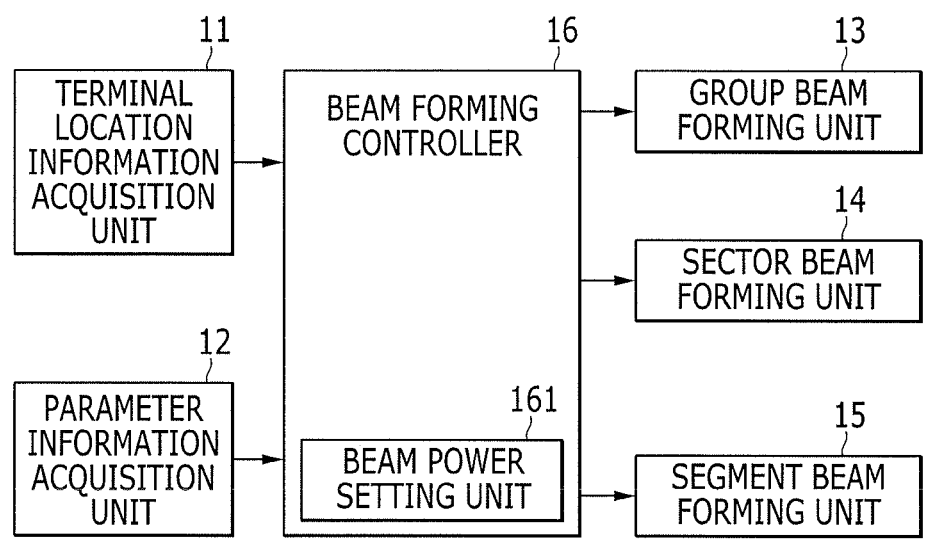
FIG. 7 is a block diagram illustrating a configuration of a beam forming apparatus according to an exemplary embodiment of the present invention.

FIG. 7 is a block diagram illustrating a configuration of a beam forming apparatus according to an exemplary embodiment of the present invention.

As shown in FIG. 7, a beam forming apparatus 1 according to an exemplary embodiment of the present invention includes a terminal location information acquisition unit 11, a parameter information acquisition unit 12, a group beam forming unit 13, a sector beam forming unit 14, a segment beam forming unit 15, and a beam forming controller 16 that enables forming a beam by operating the beam forming units 13, 14, and 15.

The terminal location information acquisition unit 11 acquires location information of a mobile terminal accessing to a satellite network. When the mobile terminal 40 mounts a location information system such as a global positioning system (GPS), the terminal location information acquisition unit 11 can directly obtain location information from a mobile terminal attempting communication. However, when a location information system such as a GPS is not used, the beam forming apparatus 1 acquires channel information of a mobile terminal wanting to communicate with a satellite, thereby obtaining location information.

The parameter information acquisition unit 12 acquires information that is related to a beam forming parameter. Specifically, the parameter information acquisition unit 12 acquires information including a QoS and a channel state of an accessing mobile terminal and a service requirement of the mobile terminal, and acquires the number of terminals within the entire coverage.

The beam forming controller 16 controls a beam forming operation based on location information of a mobile terminal that is provided from the terminal location information acquisition unit 11 and parameter-related information that is provided from the parameter information acquisition unit 12. By driving the group beam forming unit 13 based on parameter-related information including location information of the mobile terminal, one beam is formed on a beam group basis, or by driving the sector beam forming unit 14, one beam is formed on a beam sector basis, and by driving the segment beam forming unit 15, one beam is formed on a beam segment basis. That is, one mobile terminal is selected on a beam sector basis, and a size of a beam for the mobile terminal is determined based on information that is acquired for the selected mobile terminal, and by driving one of the group beam forming unit 13, the sector beam forming unit 14, and the segment beam forming unit 15, a beam is formed.

The group beam forming unit 13 forms one beam on a beam group basis, the sector beam forming unit 14 forms one beam on a beam sector basis, and the segment beam forming unit 15 forms one beam on a beam segment basis.

The beam forming controller 16 includes a beam power setting unit 161, and the beam power setting unit 161 sets beam power and direction when forming a beam according to a second exemplary embodiment to be described later. In this case, one of the beam forming units 13-15 forms a beam corresponding to beam power and direction that are set for each mobile terminal, and alternatively, by additionally implementing a separate beam forming unit, a beam may be formed by a method of forming a beam according to a second exemplary embodiment.

A method of forming a beam according to a first exemplary embodiment of the present invention will be described based on a beam forming apparatus having such a structure.

Figure 8A:
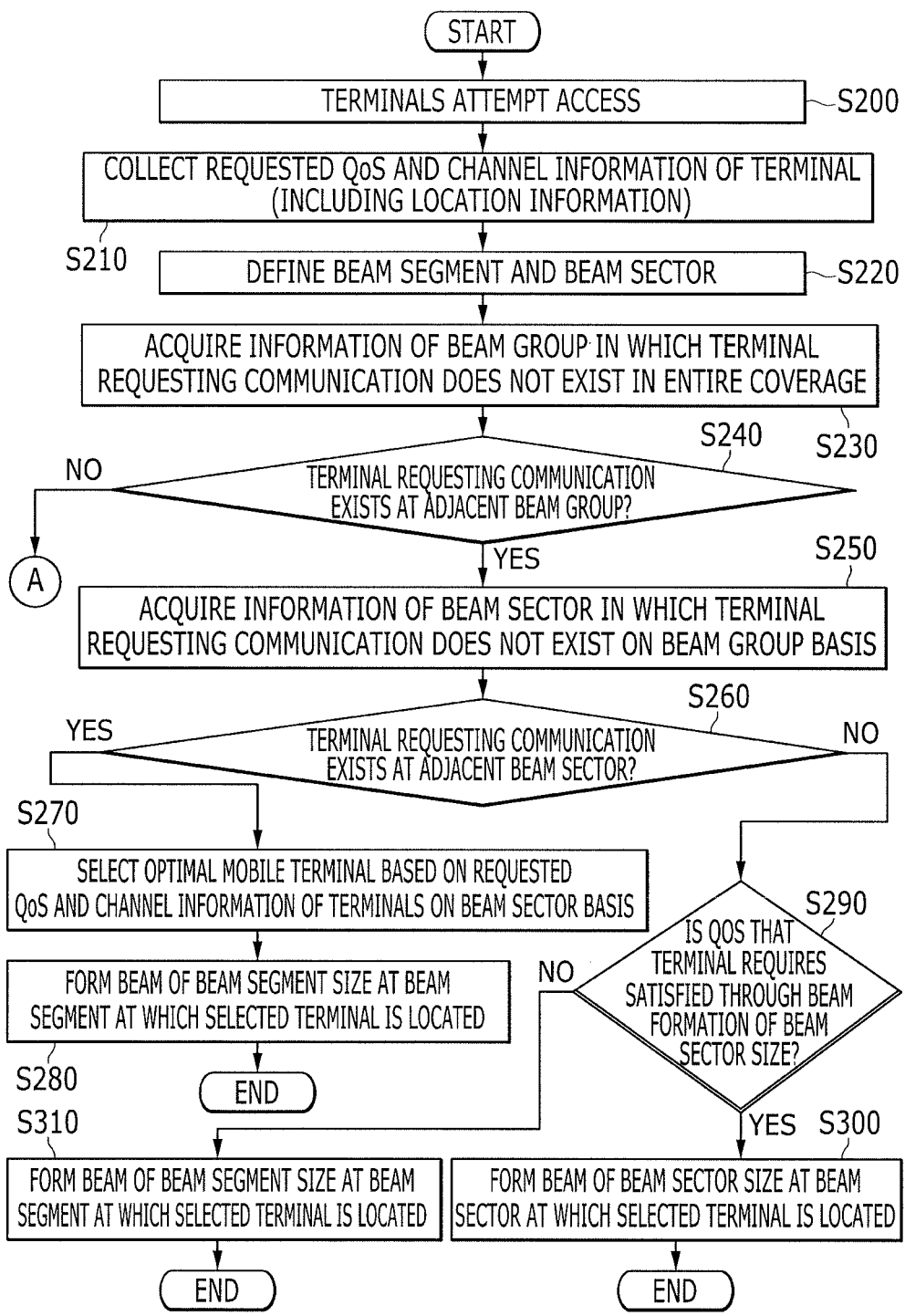
FIGS. 8A and 8B are flowcharts illustrating a method of forming a beam according to a first exemplary embodiment of the present invention.
Figure 8B:
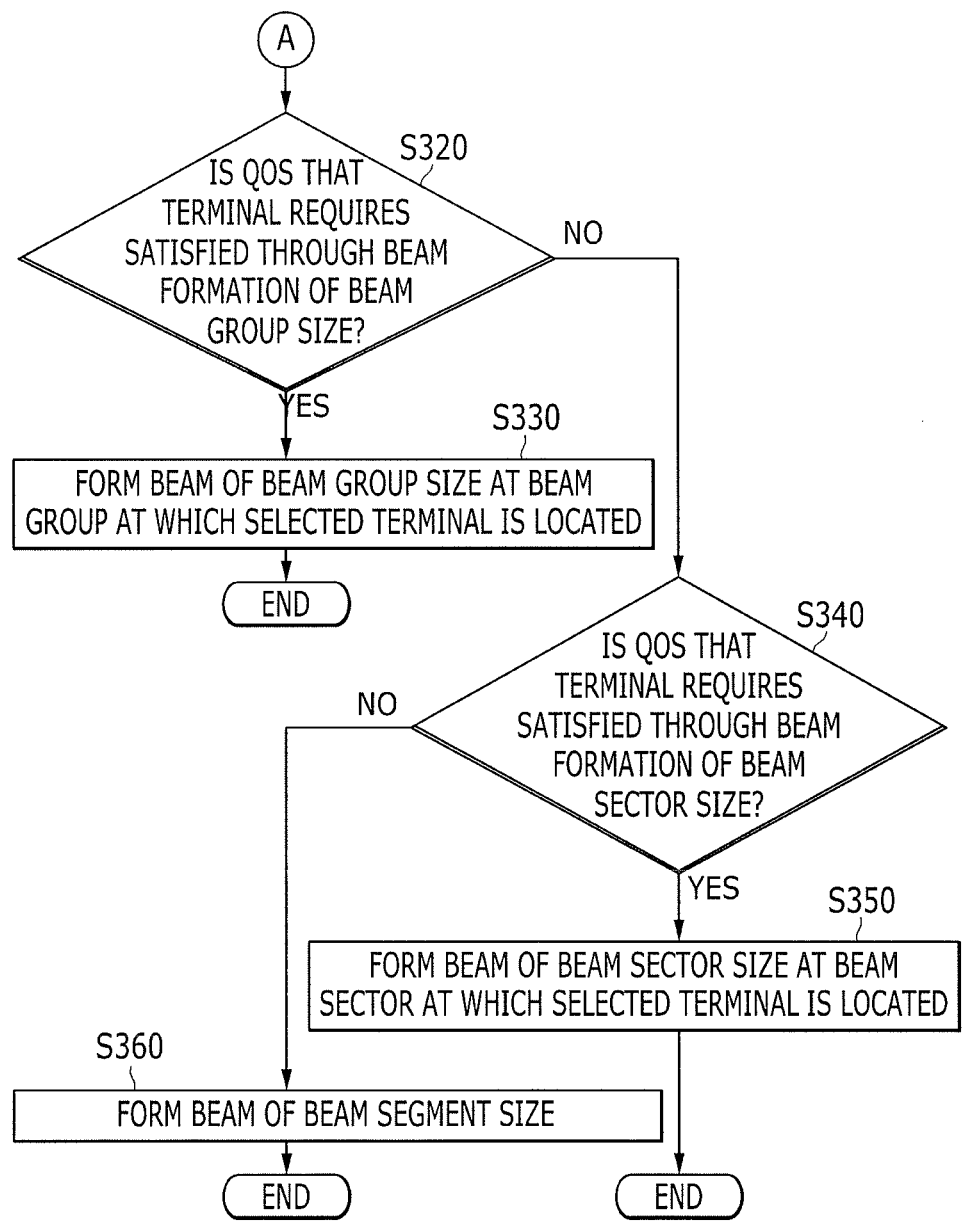

FIGS. 8A and 8B are flowcharts illustrating a method of forming a beam according to a first exemplary embodiment of the present invention.

As described above, in a communication process of FIG. 5, when mobile terminals attempt an access through a terminal access interval T2 that may be received in the entire coverage in an uplink frame, the beam forming apparatus 1 acquires parameter-related information including location information about mobile terminals attempting an access, as shown in FIG. 8A (S200 and S210). Particularly, as shown in FIG. 5, the beam forming apparatus 1 acquires location information about mobile terminals attempting an access, a QoS and a channel state of the mobile terminal, and a service requirement of the mobile terminal.

The beam forming apparatus 1 sets a beam segment in which a minimum beam is formed based on parameter-related information including the number of presently accessing mobile terminals and location information that is acquired for mobile terminals, sets a beam sector including a plurality of set beam segments, and sets a beam group including a plurality of beam sectors (S220). Therefore, as shown in FIG. 2, a beam segment, a beam sector, and a beam group having an appropriate size and shape at a present time point may be set.

In order to form an optimal beam in mobile terminals wanting to communicate with a satellite on a beam sector basis, the beam forming apparatus 1 selects one mobile terminal. Here, a mobile terminal having a poorest channel state may be selected based on acquired channel information of mobile terminals. Alternatively, a priority is determined according to a required QoS of mobile terminals, and a mobile terminal having a highest priority may be selected. Such a reference for selecting a mobile terminal may be changed according to a service operation method of a system operator.

After a mobile terminal is selected on a beam sector basis, the beam forming apparatus 1 determines whether a selected mobile terminal exists at beam sectors that are included in a corresponding beam group on a beam group basis. That is, in order to form an optimal beam on a beam group basis, the beam forming apparatus 1 determines whether a selected mobile terminal exists and acquires information of a beam group in which a selected mobile terminal doest not exist in all beam sectors among beam groups. That is, the beam forming apparatus 1 acquires information of a beam group in which a mobile terminal requesting communication does not exist (S230).

The beam forming apparatus 1 forms a beam for the selected mobile terminal on a beam sector basis based on the acquired information. For this purpose, the beam forming apparatus 1 determines whether a mobile terminal requesting communication exists at a beam group adjacent to a beam group at which the selected mobile terminal is located (S240). For example, the beam forming apparatus 1 determines whether an adjacent beam group is a beam group in which a mobile terminal requesting communication does not exist based on information of a beam group in which a mobile terminal requesting communication does not exist.

When a mobile terminal requesting communication exists at an adjacent beam group, the beam forming apparatus 1 searches for a beam sector in which a mobile terminal requesting communication does not exist on a beam group basis, and acquires information of a beam sector in which a mobile terminal does not exist. That is, the beam forming apparatus 1 acquires information of a beam sector in which a mobile terminal requesting communication does not exist (S250). The beam forming apparatus 1 determines whether a mobile terminal requesting communication exists at a beam sector adjacent to a beam sector at which the selected mobile terminal is located based on the acquired information (S260). For example, the beam forming apparatus 1 determines whether an adjacent beam sector is a beam sector in which a mobile terminal requesting communication does not exist based on information of a beam sector in which a mobile terminal requesting communication does not exist.

If a mobile terminal requesting communication exists at an adjacent beam sector, the beam forming apparatus 1 forms a beam on a beam segment basis. For this purpose, the beam forming apparatus 1 selects a mobile terminal on a beam sector basis (S270) and forms a beam of a size corresponding to a beam segment at which a selected mobile terminal is located by driving the segment beam forming unit 15 (S280). Here, the beam forming apparatus 1 selects an optimal mobile terminal based on a QoS and channel state information of mobile terminals requesting communication on a beam sector basis and forms a beam of a corresponding beam segment size.

If a mobile terminal requesting communication does not exist at a beam sector adjacent to a beam sector at which the selected mobile terminal is located at step S260, the beam forming apparatus 1 determines whether a QoS that the mobile terminal requires is satisfied through beam formation of a beam sector size (S290). For example, when requesting a service, the terminal transmits QoS information such as a data speed and a bit error rate (BER) that the terminal requires to a satellite. The satellite determines whether a QoS that the terminal requires can be satisfied in consideration of power and a channel situation that a beam sector can support.

When a QoS of the mobile terminal can be satisfied through beam formation of a beam sector size, the beam forming apparatus 1 forms a beam corresponding to a size of a beam sector at which the selected mobile terminal is located by driving the sector beam forming unit 14 (S300).

However, when a QoS of the mobile terminal cannot be satisfied through beam formation of a beam sector size, the beam forming apparatus 1 forms a beam of a size corresponding to a beam segment at which the selected mobile terminal is located by driving the segment beam forming unit 15 (S310). In this way, when a mobile terminal requesting communication does not exist at a beam sector adjacent to a beam sector at which a mobile terminal attempting communication is located, by increasing a beam size, if possible according to whether a QoS of the mobile terminal is satisfied, an overhead of a satellite payload can be reduced.

If a mobile terminal requesting communication does not exist at a beam group adjacent to a beam group at which the selected mobile terminal is located at step S240, in order to form a large size beam, if possible, as shown in FIG. 8B, the beam forming apparatus 1 determines whether a QoS that the mobile terminal requires can be satisfied through beam formation of a beam group size (S320). If a QoS that the mobile terminal requires can be satisfied through beam formation of a beam group size, the beam forming apparatus 1 forms a beam corresponding to a beam group size by driving the group beam forming unit 13 (S330). That is, the beam forming apparatus 1 forms a beam of a beam group size to correspond to a beam group at which the selected mobile terminal is located.

If a QoS that the mobile terminal requires cannot be satisfied through beam formation of a beam group size, the beam forming apparatus 1 determines whether a QoS that the mobile terminal requires can be satisfied through beam formation of a beam sector size (S340). If a QoS that the mobile terminal requires can be satisfied through beam formation of a beam sector size, the beam forming apparatus 1 forms a beam corresponding to a beam sector size by driving the sector beam forming unit 14 (S350). If a QoS that the mobile terminal requires cannot be satisfied through beam formation of a beam sector size, the beam forming apparatus 1 forms a beam of the beam segment size by driving the segment beam forming unit 15 (S360). Accordingly, one beam is formed for a selected mobile terminal per beam sector, and when a mobile terminal requesting communication does not exist at a beam group adjacent to a beam group including a beam sector at which the selected mobile terminal is located, a beam size can be increased, if possible, according to whether a QoS of the mobile terminal is satisfied. Particularly, a beam size is adaptively set to one of sizes corresponding to a beam group, a beam sector, and a beam segment.

Hereinafter, a method of forming a beam according to a second exemplary embodiment of the present invention will be described.

In a second exemplary embodiment of the present invention, in consideration of all terminals simultaneously attempting communication without dividing a beam segment or a beam sector, beam size and beam power to form in each terminal is optimized as in Equation 1, and a beam is formed.

$$\text{Maximize} \sum_{m=1}^{M} \log\left(1 + \frac{P_m G_{m,m}(\theta_j) H_{m,m}}{No + \sum_{j=1, j \neq m}^{M} P_j G_{j,m}(\theta_j) H_{j,m}}\right)$$

$$\text{subject to } \sum_{m=1}^{M} Pm < Pmax$$

[Equation 1]

Herein, M represents the number of terminals within the entire coverage of a satellite, $P_{max}$ represents maximum power of the satellite, and $G_{j,m}(\theta_j)$ represents that an angle of an j-th beam has $\theta_j$ and an antenna gain to an m-th mobile terminal. $H_{j,m}$ represents a channel state between the j-th beam and the m-th terminal. $H_{s,m}$ represents a channel state between the satellite and the m-th mobile terminal, $G_{s,m}$ represents an antenna gain between the satellite and the m-th terminal, and $P_{s,m}$ represents transmission power of a signal between the satellite and the m-th terminal. Further, $\sum_{m=1}^{M} Pm$ represents the sum of power of each beam.

In a second exemplary embodiment of the present invention, as in Equation 1, power and an angle of a beam are determined to maximize a capacity of a beam access of all mobile terminals attempting an access under a limitation that $\sum_{m=1}^{M} Pm < Pmax$, i.e., the sum of power of each beam is smaller than maximum power that a satellite can output.

In order to optimize Equation 1, an optimization method similar to the resource allocation optimization algorithm of existing cellular communication may be used. For example, beam power is first optimized, and after a beam direction is optimized, a method of iteratively optimizing power and direction of the beam may be used. More specifically, Equation 1 represents that power and a direction are allocated to maximize an entire system SINR and minimizes interference of the entire system. For example, when the number of selectable terminals is M, in consideration of the number of powers and directions that the M number of terminals may select according to Equation 1, a combination of power and a direction of each terminal in which the sum of SINRs of each terminal becomes the maximum is searched for. A beam having an optimal beam size and beam power for each terminal is formed based on the possible combination.

Figure 9:
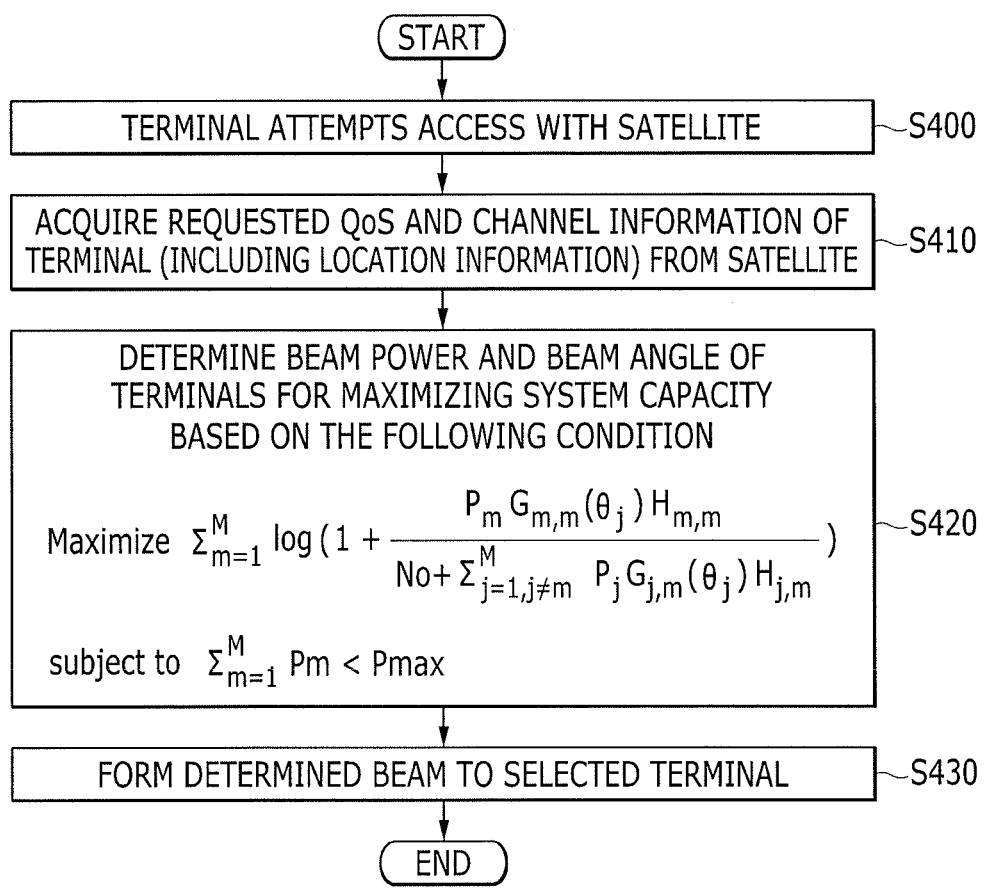
FIG. 9 is a flowchart illustrating a method of forming a beam according to a second exemplary embodiment of the present invention.

FIG. 9 is a flowchart illustrating a method of forming a beam according to the second exemplary embodiment of the present invention.

In a communication process according to FIG. 5, information about mobile terminals that are determined as terminals that can form an optimal beam at a present time point among mobile terminals attempting an access is acquired. However, referring to FIG. 9, the beam forming apparatus 1 acquires parameter-related information (request QoS and channel information) including location information about mobile terminals attempting an access, as in the first exemplary embodiment (S400 and S410).

The beam forming apparatus 1 optimizes a power and direction of beam to be formed to each mobile terminal according to Equation 1, based on acquired information of all mobile terminals attempting an access within the entire coverage.

Specifically, with respect to mobile terminals attempting an access within the entire coverage, under a condition that the sum of powers of beams of mobile terminals is smaller than maximum power that a satellite can output, transmission power of a signal is optimized based on maximum power of a beam that a satellite can transmit, the angle of the beam, an antenna gain according to an angle of a beam, a channel environment, and a channel state based on Equation 1. A direction of a beam is optimized based on optimized signal transmission power.

In this way, for a mobile terminal that is selected to communicate, the beam forming apparatus 1 obtains optimal signal transmission power and an optimal transmission direction, i.e., an angle $\theta_j$ of a beam, based on Equation 1 (S420). The beam forming apparatus 1 forms a beam for a corresponding mobile terminal based on the calculated transmission power and the beam angle (S430).

The above-described beam formation process according to the first and second exemplary embodiments may be individually performed for terminals attempting an access within the entire coverage.

According to an exemplary embodiment of the present invention, a mobile communication system having a multi-cell according to a multi-beam does not use a beam having a fixed size, and communicates by adaptively adjusting a size of a beam based on information about an accessing mobile terminal. Accordingly, a multi-beam mobile communication system having a frequency reuse ratio of 1 can be provided. Further, as the multi-beam mobile communication system has a frequency reuse ratio of 1, the multi-beam mobile communication system can provide a high speed data service to a mobile terminal.

The foregoing exemplary embodiments of the present invention may not only be embodied through an apparatus and method, but may also be embodied through a program that executes a function corresponding to a configuration of a method according to the exemplary embodiment of the present invention or through a computer recording medium in which the program is recorded, and can be easily embodied by a person of ordinary skill in the art from a description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication method in a system that performs mobile communication using at least two beams, the communication method comprising:
   acquiring, when a mobile terminal attempts an access through a second terminal access interval that is set to an uplink frame based on a downlink signal that is transmitted through a first terminal access interval that is set to a downlink frame, information about the mobile terminal;
   allocating a resource for the mobile terminal;
   transmitting the resource allocation information from the downlink frame through the first terminal access interval;
   determining a beam size based on information that is acquired for the mobile terminal; and
   communicating with the mobile terminal through an allocated resource according to a beam that is formed based on the determined beam size.

2. The communication method of claim 1, wherein the first and second terminal access intervals are intervals that transmit to and receive from anywhere in the entire coverage that the system services and to which all terminals can connect, and that do not form a multi-beam.

3. The communication method of claim 1, further comprising determining mobile terminals for forming an optimal beam among mobile terminals attempting the access,
   wherein the transmitting of the resource allocation information comprises transmitting information about the determined mobile terminal.

4. The communication method of claim 3, wherein the information that is acquired for the mobile terminal comprises a location, a required quality of service (QoS), and a channel state of the mobile terminal, and
   the determining of mobile terminals comprises setting each beam sector comprising a plurality of beam segments and a beam segment that forms a beam of a minimum size based on the acquired information and selecting one mobile terminal on a beam sector basis.

5. The communication method of claim 4, wherein the determining of a beam size comprises forming only one beam per beam sector in consideration of interference between mobile terminals.

6. The communication method of claim 5, wherein the determining of a size comprises determining, when a mobile terminal that requests communication does not exist at a beam group adjacent to a beam group comprising a beam sector at which a mobile terminal that is selected at one beam sector among the mobile terminals is located, a size of a beam for the mobile terminal according to whether a QoS that the mobile terminal requires satisfies a size corresponding to one of a beam group, a beam sector, and a beam segment.

7. The communication method of claim 5, wherein the determining of a size comprises determining, when a mobile terminal that requests communication does not exist at a beam sector adjacent to a beam sector at which a mobile terminal that is selected at one beam sector among the mobile terminals is located, a size of a beam for the mobile terminal according to whether a QoS that the mobile terminal requires satisfies a size corresponding to one of a beam sector and a beam segment.

8. The communication method of claim 5, wherein the determining of a size comprises determining, when a mobile terminal that requires communication exists at a beam sector adjacent to a beam sector in which a mobile terminal that is selected at one beam sector among the mobile terminals is located, a size of a beam for the mobile terminal to be a size corresponding to a beam segment at which the mobile terminal is located.

9. The communication method of claim 1, wherein the determining of a size comprises:
   acquiring information comprising a channel environment and a channel state for all terminals attempting the access; and
   determining maximum power and an angle of a beam that a satellite can transmit and transmission power of a beam based on an antenna gain, a channel environment, and a channel state according to a beam angle, and determining a direction of a beam based on the determined transmission power.

10. The communication method of claim 9, further comprising determining transmission power of the beam and a direction of the beam according to a condition of $$\text{Maximize} \sum_{m=1}^{M} \log\left(1 + \frac{P_m G_{m,m}(\theta_j) H_{m,m}}{No + \sum_{j=1, j \neq m}^{M} P_j G_{j,m}(\theta_j) H_{j,m}}\right)$$

$$\text{subject to } \sum_{m=1}^{M} Pm < Pmax$$

wherein M represents the number of terminals within the entire coverage of a satellite, $P_{max}$ represents maximum power of the satellite, $G_{j,m}(\theta_j)$ represents that a j-th beam angle is $\theta_j$ and an antenna gain to an m-th mobile terminal,
$H_{j,m}$ represents a channel state between a j-th beam and an m-th terminal,
$H_{m,m}$ represents a channel state between the satellite and the m-th mobile terminal, $G_{s,m}$ represents an antenna gain between the satellite and the m-th terminal, $P_{s,m}$ represents transmission power of a signal between the satellite and the m-th terminal, and
$\Sigma_{m=1}^{M} Pm$ represents the sum of power of each beam.

11. The communication method of claim 1, wherein a frequency reuse ratio of the mobile terminal is 1.

12. A communication method in a system that performs mobile communication using at least two beams, the communication method comprising:
   acquiring information comprising a location, a requested QoS, and a channel state of mobile terminals attempting an access, and setting a beam sector comprising a beam segment that forms a beam of a minimum size and a plurality of beam segments based on the acquired information;

selecting one mobile terminal on a beam sector basis and determining a size of a beam for the mobile terminal based on the information that is acquired for the selected mobile terminal;

forming a beam having the determined size and forming one beam on a beam sector basis; and communicating with the mobile terminal through the formed beam.

13. The communication method of claim 12, wherein the determining of a size comprises determining, when a mobile terminal that requests communication does not exist at a beam group adjacent to a beam group comprising a beam sector at which a mobile terminal that is selected at one beam sector among the mobile terminals is located, a size of a beam for the mobile terminal according to whether a QoS that the mobile terminal requests satisfies a size corresponding to one of a beam group, a beam sector, and a beam segment.

14. The communication method of claim 13, wherein the determining of a size of a beam for the mobile terminal comprises:

determining, when a QoS that the mobile terminal requires is satisfied based on a beam of a size of a beam group in which the mobile terminal is included, a size of a beam for the mobile terminal to be a size corresponding to a beam group;

determining, when a QoS that the mobile terminal requires is not satisfied based on a beam of the beam group size and when a QoS that the mobile terminal requires is satisfied based on a beam of a size of a beam sector in which the mobile terminal is included, a size of a beam for the mobile terminal to be a size corresponding to a beam sector; and determining, when a QoS that the mobile terminal requires is not satisfied based on a beam of the beam sector size and when a QoS that the mobile terminal requires is satisfied based on a beam of a size of a beam segment in which the mobile terminal is included, a size of a beam for the mobile terminal to be a size corresponding to a beam segment.

15. The communication method of claim 12, wherein the determining of a size comprises determining, when a mobile terminal that requires communication exists at a beam sector adjacent to a beam sector in which a mobile terminal that is selected at one beam sector among the mobile terminals is located, a size of a beam for the mobile terminal to be a size corresponding to a beam segment at which the mobile terminal is located.

16. The communication method of claim 12, wherein the determining of a size comprises:

determining, when a mobile terminal that requires communication does not exist at a beam sector adjacent to a beam sector in which a mobile terminal that is selected at one beam sector among the mobile terminals is located, if a QoS that the mobile terminal requires is satisfied based on a beam of a size of a beam sector in which the mobile terminal is included, a size of a beam for the mobile terminal to be a size corresponding to a beam sector; and determining, when a QoS that the mobile terminal requires is not satisfied based on a beam of the beam sector size and when a QoS that the mobile terminal requires is satisfied based on a beam of a size of a beam segment in which the mobile terminal is included, a size of a beam for the mobile terminal to be a size corresponding to a beam segment.

17. A beam forming apparatus in a system that performs mobile communication using at least two beams, the beam forming apparatus comprising:

a terminal location information acquisition unit that acquires location information of mobile terminals attempting an access;

a parameter information acquisition unit that acquires information comprising a channel state and a QoS that is requested to mobile terminals attempting an access;

a beam forming controller that sets a beam sector comprising a beam segment that forms a beam of a minimum size and a plurality of beam segments based on information that is acquired for mobile terminals;

a group beam forming unit that forms one beam on a beam group basis comprising a plurality of beam sectors;

a sector beam forming unit that forms one beam on a beam sector basis; and a segment beam forming unit that forms one beam on a beam segment basis, wherein the beam forming controller selects one mobile terminal on a beam sector basis, determines a beam size of the mobile terminal based on the information that is acquired for the selected mobile terminal, and forms a beam by driving one of the group beam forming unit, the sector beam forming unit, and the segment beam forming unit.

18. The beam forming apparatus of claim 17, wherein the beam forming controller determines, when a mobile terminal requesting communication does not exist at a beam group adjacent to a beam group comprising a beam sector at which a mobile terminal that is selected at one beam sector is located or at a beam sector adjacent to a beam sector at which the mobile terminal is located, a beam size for the mobile terminal according to whether a QoS that the mobile terminal requests satisfies a size corresponding to one of a beam group, a beam sector, and a beam segment.

19. The beam forming apparatus of claim 17, wherein the beam forming controller determines, when a terminal requesting communication exists at a beam sector adjacent to a beam sector in which a mobile terminal that is selected at one beam sector is located, a size of a beam for the mobile terminal to be a size corresponding to a beam segment at which the mobile terminal is located.

* * * * *